(12) United States Patent
Ryman

(10) Patent No.: US 11,946,579 B2
(45) Date of Patent: Apr. 2, 2024

(54) MULTI-PART CONNECTOR ASSEMBLY

(71) Applicant: Oetiker Schweiz AG, Horgen (CH)

(72) Inventor: Morgan Ryman, Anderstorp (SE)

(73) Assignee: Oetiker Schweiz AG, Horgen (CH)

( * ) Notice: Subject to any disclaimer, the term of this patent is extended or adjusted under 35 U.S.C. 154(b) by 389 days.

(21) Appl. No.: 17/295,922

(22) PCT Filed: Nov. 23, 2018

(86) PCT No.: PCT/EP2018/082355
§ 371 (c)(1),
(2) Date: May 21, 2021

(87) PCT Pub. No.: WO2020/104039
PCT Pub. Date: May 28, 2020

(65) Prior Publication Data
US 2022/0010906 A1    Jan. 13, 2022

(51) Int. Cl.
*F16L 37/098*  (2006.01)
*F16L 33/18*  (2006.01)
*F16L 33/30*  (2006.01)

(52) U.S. Cl.
CPC ........... *F16L 37/0985* (2013.01); *F16L 33/18* (2013.01); *F16L 33/30* (2013.01)

(58) Field of Classification Search
CPC . F16L 21/00; F16L 21/02; F16L 21/03; F16L 33/16; F16L 33/18; F16L 33/30; F16L 33/227; F16L 37/0985; F16L 37/1235; F16L 37/133; F16L 37/098; F16L 47/24; F16L 47/06; F16L 47/08; F16L 47/10; F16L 47/12
See application file for complete search history.

(56) References Cited

U.S. PATENT DOCUMENTS

| | | | |
|---|---|---|---|
| 5,261,709 A | 11/1993 | McNaughton et al. | |
| 5,779,286 A | 7/1998 | Kaishio | |
| 7,267,376 B2 | 9/2007 | Isayama et al. | |
| 2001/0048225 A1* | 12/2001 | Andre | F16L 33/30 |
| | | | 285/305 |
| 2016/0245441 A1 | 8/2016 | Klein et al. | |

FOREIGN PATENT DOCUMENTS

| | | |
|---|---|---|
| CN | 1764802 A | 4/2006 |
| DE | 3603479 C1 | 5/1987 |
| JP | 2003247684 A | 9/2003 |
| RU | 2100684 C1 | 12/1997 |
| WO | 9607045 A1 | 3/1996 |
| WO | 2011023888 A1 | 3/2011 |
| WO | WO2011023888 A1 | 3/2011 |

OTHER PUBLICATIONS

International Search Report Form PCT/ISA/210, and Written Opinion Form PCT/ISA/237, International Application No. PCT/EP2018/082355, pp. 1-13 International Filing Date Nov. 23, 2018.

* cited by examiner

*Primary Examiner* — Aaron M Dunwoody
(74) *Attorney, Agent, or Firm* — David L. Nocilly; Bond Schoeneck & King PLLC

(57) ABSTRACT

A multi-part connector assembly is provided which realises a compact snap coupling between a hose (40) and a pipe socket (50) with only a single potential leaking position and requiring only a minimum number of parts: a first retaining member (10), a second retaining member (20) and a sealing element (30) sandwiched therebetween in the axial direction of the connector assembly.

13 Claims, 2 Drawing Sheets

SECTION A-A

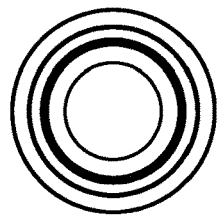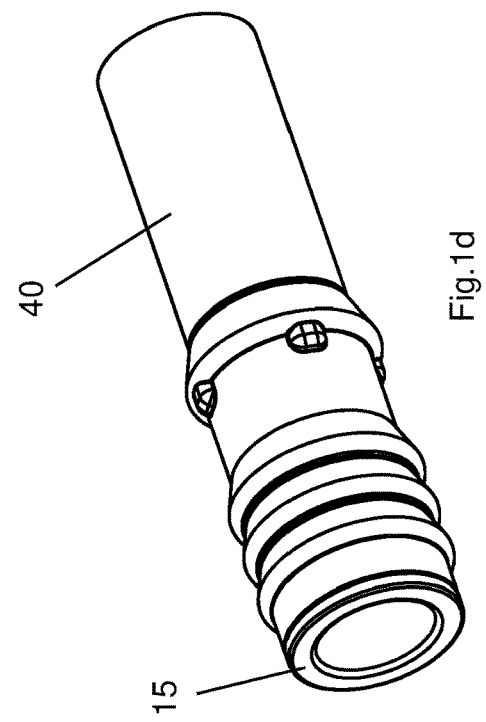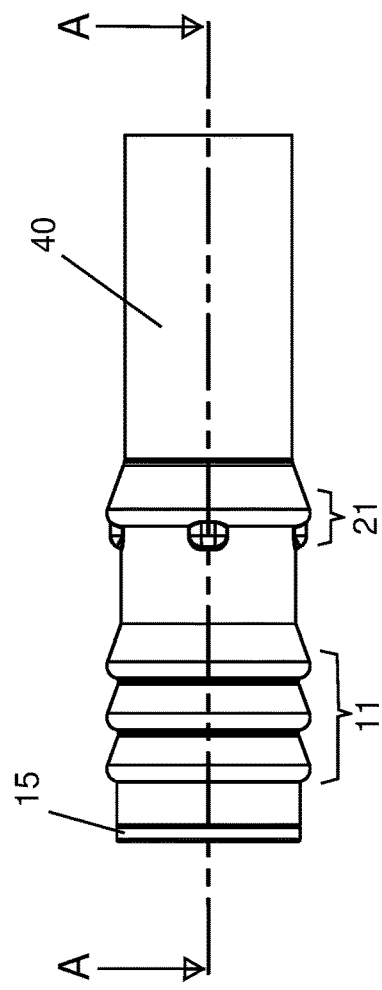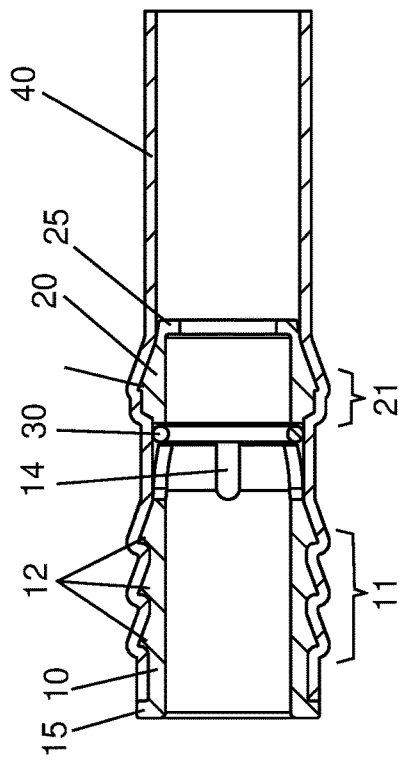

MULTI-PART CONNECTOR ASSEMBLY

CROSS-REFERENCE TO RELATED APPLICATIONS

Figures 2A, 2B:
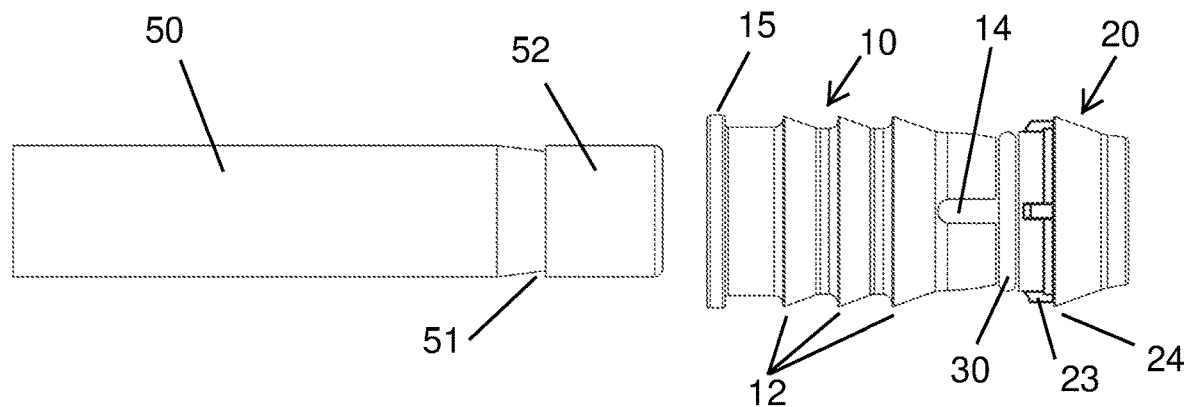

The present application is a US national phase of PCT Application No. PCT/EP2018/082355, filed on Nov. 23, 2018, the disclosure of which is incorporated herein by reference in its entirety.

BACKGROUND OF THE INVENTION

1. Field of the Invention

The present invention relates to a coupling device and method for connecting a hose to a spigot or pipe socket as a so-called quick connector or snap connector.

2. Description of the Related Art

Quick connectors or snap connectors are utilised in a wide range of applications, particularly to join fluid carrying conduits in automotive and industrial applications. A hose made from a flexible polymer material needs to be connected quickly and with a reliable seal to a spigot. The hose forms the female portion and the spigot forms the male portion of the fluid connection, whereas the connector assembly should be able to realise a quick and fully sealing connection of the two portions in a snap-fit action.

Conventional snap connectors have a first retainer portion for receiving the male spigot (in the following also referred to as nipple or pipe socket) and a second retainer portion for engaging with the female hose. Both retainer portions need to be provided with sealing means such as O-rings at different positions to form a seal with the spigot and the hose, respectively. In other words, each retainer portion forms a sealing position and each sealing position represents a potential leak part. Further, the conventional snap connectors require considerable mounting space in the axial direction and have an overall diameter which is considerably larger than that of the hose. This is of particular disadvantage in automotive applications in the field of e-mobility where mounting space for battery packs and the corresponding cooling circuits are critical issues.

SUMMARY OF THE INVENTION

The object of the present invention is to address the above drawbacks of conventional snap connectors and provide a compact connector assembly with a minimum number of components and potential leak parts, in particular with only one sealing position. Further, smaller outer dimensions in both the radial and the axial direction of the hose-spigot-system in its connected state are desirable.

The above object is met by the connector assembly described herein.

Unlike any connector assembly in the prior art, the connector assembly of the present invention arranges the first and second retaining members spaced-apart from each other in the axial direction so that one sealing element can be axially interposed and thus form a seal directly between the hose and the spigot. In other words, the first and second retaining members are tubular members which are coaxially arranged with an axial gap forming a single sealing position in which the sealing element can be sandwiched. Thereby, no second sealing position/element is required anymore.

According to a preferred embodiment of the present invention, the first and second retaining members and the sealing element are provided as at least three separate parts. However, it is also possible to form the at least three parts interconnected with each other (e.g. by a moulding process from appropriate synthetic materials) as long as the first and second retaining members do not overlap with each other in the axial direction. All parts of the connector assembly are preferably made from plastic materials, in particular polyamides (PA) or thermoplastic elastomers (TPE).

Preferably, the second retaining member is fully inserted into the hose and the first retaining member is inserted into the hose up to a first flange which serves as a first abutment portion. The sealing element is for example an O-ring, an X-seal or a lip seal which is disposed axially between the first and second retaining members. Thereafter, the pipe socket is fully pushed through the first retaining member, the sealing element and then inserted into the second retaining member up to a second flange which serves as a second abutment portion provided at the distal (i.e. frontward) end thereof.

Due to the fact that the outer diameter of the pipe socket is larger than the inner diameter of the O-ring in its unexpanded state, the O-ring is widened in the radial direction so that its outer diameter contacts the inner diameter of the hose to form a seal. Furthermore, since the first and second retaining members are arranged almost completely within the hose, the overall axial extension of the hose-spigot-system in its connected state increases only slightly. Also, the radial size increases only as far as the flexible polymer material of the hose widens due to the insertion of the first and second members. In other words, the connector assembly is almost fully integrated into the hose so that the system in its connected state is more compact than in the prior art. In summary, the present snap connection requires less mounting space in both the axial and the radial direction of the hose.

In order to provide a reliable connection between the hose and the first and second retaining members both said members comprise a tightening portion with one or more angular ridges. These ridges have a sawtooth cross-section and allow a smooth insertion of the first and second retaining members into the hose but provide a high friction when trying to pull the members out of the hose in the opposite direction. Additionally, the second member may comprise a plurality of radial protrusions or barbs provided on the outer surface at circumferentially spaced positions for further enlarging the pull-out friction and additionally prohibiting any rotational movement of the hose relative to the second member. This allows a reliable connection between the hose and the first and second members in use when the hose may conduct a fluid under high pressure. Additionally, the connection may be secured by one or more outer hose clamps around the outer circumference of the hose.

According to a further preferred embodiment of the present invention, the first retaining member has a tapered end portion which is flexibly deformable in the radial direction and can snap into a corresponding recessed portion close to the distal end of the pipe socket. This allows a snap engagement between the first retaining member and the pipe socket accompanied by a typical clicking sound which indicates the correct and full insertion of the pipe socket into the connector assembly placed within the hose.

BRIEF DESCRIPTION OF THE SEVERAL VIEWS OF THE DRAWING(S)

Figure 2C:
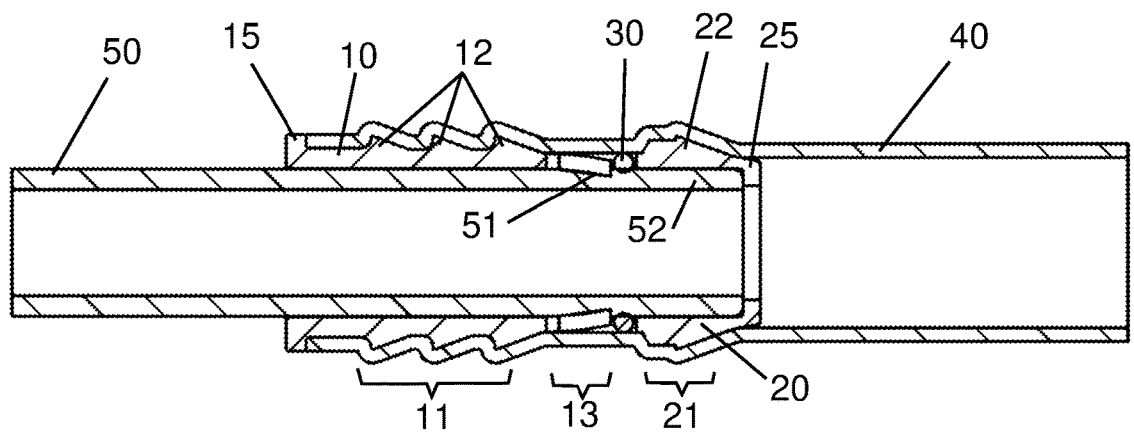

A detailed embodiment will now be described with reference to the drawings. Therein shows:

FIG. 1*a* a side view of a hose with an inserted connector assembly according to an embodiment of the present invention, FIG. 1*b* a cross sectional view of the system of FIG. 1*a*, FIG. 1*c* a sectional view taken along the line A-A in FIG. 1*a*, FIG. 1*d* a perspective view of the system of FIG. 1*a*, FIG. 2*a* a side view of a pipe socket, FIG. 2*b* a side view of the three-part connector assembly according to the embodiment of the present invention, and FIG. 2*c* a sectional view of the pipe socket coupled with the hose by the connector assembly according to the embodiment of the present invention.

DETAILED DESCRIPTION OF THE INVENTION

FIG. 1*a* shows the hose end 40 to be connected to the pipe socket 50 shown in FIG. 2*a*. The hose end 40 snuggly fits onto the outer surface of the first and second members 10, 20 so that its outer contour resembles that of the first and second members 10, 20. Only the flange portion 15 of the first member 10 remains outside the hose 40 and is shown on the leftmost side of FIGS. 1*a* and 1*d*. The details can best be seen and understood from the sectional views in FIGS. 1*c* and 2*c*.

FIG. 1*c* shows a connector assembly substantially consisting of three parts, the first retaining member 10 to be engaged with the hose 40 and the pipe socket 50, the second retaining member 20 to be engaged with the hose 40, and the sealing element in form of an O-ring 30 which is axially interposed between the first and second members 10, 20 and adapted to form a seal between the outer surface of the pipe socket 50 and the inner surface of the hose 40.

The first retaining member 10 has a first flange portion 15 which has substantially the same outer diameter as the hose 14 so that the hose 40 abuts against this portion 15 when the first member 10 is inserted into the hose 40. Adjacent to this first flange portion 15, the first member 10 continues with a region which has the same inner diameter but a smaller outer diameter than the first flange portion 15 and then continues with a first tightening portion 11 having a plurality of ridges 12 which allow a tight connection between the inner surface of the hose 40 and the outer surface of the tightening portion 11. Adjacent thereto in the distal (i.e. frontward) direction of the first member 10 is a tapered end portion 13 at which both the inner and outer diameter of the first member 10 gradually decrease.

The tapered end portion 13 further has a plurality of axial slits 14 which provide the end portion 13 with sufficient radial flexibility to be deformed to such an extent that a pipe socket 50 having a larger outer diameter than the tapered end portion 13 at its most frontward or distal end can be fully inserted through the first member 10.

The second retaining member 20 is shown in FIG. 1*c* in a fully inserted position within the hose 40. It has a second tightening portion 21 and a second flange portion 25. The second tightening portion 21 includes at least one angular ridge 22 which prevents the second member 20 to be pulled out from the hose 40 in the direction opposite to the direction of insertion. Additionally, the second tightening portion 22 includes a plurality of circumferentially spaced protrusions or barbs 23 which not only increase the friction between the hose 40 and the second member 20 in the axial direction but also prevent any rotational movement of the second member 20 relative to the hose 40. The second flange portion 25 is located at the most frontward end of the connector assembly and has a reduced inner diameter which serves as an abutment for the pipe socket 50 when inserted as shown and described in FIGS. 2*a*-*c* below.

Interposed between the first and second retaining members 10, 20 is the sealing element 30 in the form of an O-ring of a suitable polymer material. The O-ring 30 is sandwiched between the first and second retaining members 10, 20 and elastically deformable to an extent that allows it to form a seal with both the pipe socket 50 and the hose 40 when press-fitted in the system configuration shown in FIG. 2*c* below.

There may be a cylindrical plug (not shown) for holding the three parts of the connector assembly together until the connector is finally used to connect the hose 40 with the pipe 50. The multi-part connector assembly of the present invention is produced, packaged and delivered so that the plug extends through the central through-bore formed by the first and second retaining members 10, 20 and the interposed O-ring 30. The plug holds the three components in their correct positions and forms a cover seal for the hose opening. The plug may even remain within the connector assembly when the connector assembly is inserted into the hose 40 in a first connecting step of the present invention. This allows easy and correct positioning of the connector assembly within the hose 40. As the second connection step, the plug is pulled out and replaced by the pipe socket 50, which generally has the same outer dimension as the plug.

The concept of the plug is described in greater detail in the co-pending international PCT application filed for the same applicant at the same day as the present application and entitled "connector". The content thereof is hereby incorporated by reference.

The sectional view of FIG. 2*c* is of the same type as that of FIG. 1*c* except that the pipe socket or nipple 50 is additionally inserted from the left side. As can best be seen in FIG. 2*a*, the pipe socket 50 has a recessed portion 51 in which the outer diameter gradually decreases in a wedge shape. Distally beyond the recessed portion 51 the pipe socket 50 forms a step to an end portion 52 which has again a larger outer diameter, preferably the same as the part proximal to the recessed portion 51 and referred to as the general outer diameter of the pipe socket 50.

As shown in FIG. 2*c*, the recessed portion 51 engages with the tapered end portion 13 of the first member 10 so that the pipe socket 50 is locked into the first member 10 after having reached the position shown in FIG. 2*c*. This locking position is reached by inserting the pipe socket 50 into the connector assembly in the direction motivated by the arrangement of FIGS. 2*a* and 2*b*. The distal or frontward end portion 52 of the pipe socket 50 has a larger diameter than the tapered end portion 13 provided at the distal end of the first member 10. However due to the radial deformability of the tapered end portion 13 achieved by the axial slits 14, the frontward end portion 52 of the pipe socket 50 can nevertheless be smoothly inserted through the first member 10 and into the second member 20 until it reaches the second flange portion 25 thereof. At this position, the recessed portion 51 reaches the tapered end portion 13 of the first member and the slits 14 relax into their original shape thereby reaching the locked state shown in FIG. 2*c*.

FIG. 2*b* shows once more the connector assembly of the present invention consisting of three separate parts in form of the first retaining member 10, the second retaining member 20 and the sealing element 30 located in an axial space between these two members 10, 20. The separation of the connector assembly into three separate parts without any overlap in the axial direction allows the connector assembly of the present invention to achieve a fully sealed snap coupling between the hose 40 and the pipe socket 50 with the minimum number of potential leaking parts and components, in particular with only a single sealing element in form of the O-ring 30. Further, the connector assembly increases the radial and axial dimensions of the connected hose-spigot-system only marginally.

It is noted that the connector assembly has been shown and described in its simplest form with two retaining members 10, 20 and one single O-ring 30. However, it can also be comprised of three or more retaining member components and two or more sealing elements, for example two O-rings at the sealing position defined by the axial gap between the two retaining members 10, 20, in particular one O-ring optimised for forming a seal at hot temperatures and one O-ring optimised for forming a seal at cold temperatures.

Moreover, the connector assembly may not only be comprised of the two retaining members 10, 20 and the sealing element 30 as three separate structural parts as shown in the Figures. It is also possible to form the sealing element 30 integrally with one or both of the two retaining members 10, 20 by an appropriate single- or multi-component moulding process or other manufacturing methods. Typical plastic materials for forming the connector parts are synthetic polymer materials featuring extremely low permeation values. Preferably, polyamides like PA 6 or PA 12 with 20-50% glass fiber content or thermoplastic elastomers (TPE) are used.

LIST OF REFERENCE SIGNS 10 first retaining member
11 first tightening portion
12 annular ridges
13 tapered portion
14 barbs
15 first flange portion
20 second retaining member
21 second tightening portion
22 annular ridge
23 barbs
25 second flange portion
30 sealing element
40 hose
50 pipe socket
51 annular recess
52 frontward end portion

The invention claimed is:

1. A connector assembly system, comprising:
a pipe socket (50);
a hose (40);
a first retaining member (10) adapted to be engaged with the pipe socket (50), wherein the first retaining member (10) has a tapered end portion (13) with an inner diameter, the tapered end portion (13) is adapted to be flexibly deformed in a radial direction of the hose (40), and the inner diameter of the tapered end portion (13) is smaller than the outer diameter of a frontward end portion (52) of the pipe socket (50);
a second retaining member (20) adapted to be engaged with the hose (40); and
a sealing element (30), wherein the first and second retaining members (10, 20) are arranged spaced-apart along an axial direction of the connector assembly with the sealing element (30) axially interposed between.

2. The connector system of claim 1, wherein the sealing element (30) has an outer surface, the hose (4) has an inner surface, and the pipe socket (50) has an outer surface, and the outer surface of the sealing element (30) is adapted to form a seal with the inner surface of the hose (40), and the inner surface of the sealing element (30) is adapted to form a seal with the outer surface of the pipe socket (50).

3. The connector system of claim 1, wherein the first and second retaining members (10, 20) are arranged along the axial direction of the connector assembly as two separate structural parts sandwiching the sealing element (30), or at least one of the first and second retaining members (10, 20) are formed integrally with the sealing element (30).

4. The connector system of claim 1, wherein the sealing element (30) is an O-ring, an X-seal or a lip seal.

5. The connector system of claim 1, wherein the first and second retaining members (10, 20) are adapted to receive the pipe socket (50), and the first and second retaining members (10, 20) are adapted to be accommodated within the hose (40).

6. The connector system of claim 1, wherein an outer surface of the first retaining member (10) has a first tightening portion (11) for forming a tight connection with an inner surface of the hose (40), and an outer surface of the second retaining member (20) has a second tightening portion (21) for forming a tight connection with the inner surface of the hose (40).

7. The connector system of claim 6, wherein the first tightening portion (11) has one or more annular ridges (12).

8. The connector system of claim 6, wherein the second tightening portion (21) has at least one annular ridge (22) and/or a plurality of circumferentially spaced barbs (23).

9. The connector system of claim 1 wherein the tapered end portion (13) has axial slits (14) providing the first retaining member (10) with sufficient radial flexibility to allow full insertion of the pipe socket (50) through the first retaining member (10).

10. The connector system of claim 1, wherein the first retaining member (10) has a first flange portion (15) with an outer diameter up to which the first retaining member (10) is to be inserted into the hose (40), and the outer diameter of the first flange portion (15) is larger than the inner diameter of the hose (40).

11. The connector system of claim 1, wherein the second retaining member (20) has a second flange portion (25) with an inner diameter up to which the pipe socket (50) is to be inserted into the second retaining member (20), and the inner diameter of the second flange portion (25) is smaller than the outer diameter of the pipe socket (50) and preferably substantially equal to the inner diameter of the pipe socket (50).

12. The system of claim 1, wherein the pipe socket (50) has an annular recess (51) to be engaged with the first retaining member (10).

13. A method for connecting a hose (40) to a pipe socket (50) by a connector assembly comprising a first retaining member (10) to be engaged with the pipe socket (50), a second retaining member (20) to be engaged with the hose (40), and a sealing element (30), comprising the steps of:
arranging the first and second retaining members (10, 20) within the hose (40) spaced-apart along an axial direction of the connector assembly with the sealing element (30) axially interposed between, and
inserting the pipe socket (50) into the first and second retaining members (10, 20) so that the diameter of the sealing element (30) is enlarged and forms a seal with the inner surface of the hose (40) and the outer surface of the pipe socket (50), wherein the first retaining member (10) has a tapered end portion (13) with an inner diameter, the tapered end portion (13) is adapted to be flexibly deformed in a radial direction of the hose (40), and the inner diameter of the tapered end portion (13) is smaller than the outer diameter of a frontward end portion (52) of the pipe socket (50).

\* \* \* \* \*